United States Patent [19]

Sommese

[11] Patent Number: 5,405,898

[45] Date of Patent: Apr. 11, 1995

[54] HYDROXYLAMINE MODIFIED LOWER ACRYLATE ESTER LATICES

[75] Inventor: Anthony G. Sommese, Naperville, Ill.

[73] Assignee: Nalco Chemical Company, Naperville, Ill.

[21] Appl. No.: 133,533

[22] Filed: Oct. 7, 1993

[51] Int. Cl.$^6$ ............................................. C08F 8/30
[52] U.S. Cl. ................................. 525/330.5; 525/374; 525/377
[58] Field of Search .................. 525/330.5, 374, 380, 525/377

[56] References Cited

U.S. PATENT DOCUMENTS

| | | |
|---|---|---|
| 3,755,531 | 8/1973 | Tsukawaki et al. . |
| 4,587,306 | 5/1986 | Vio et al. . |
| 4,767,540 | 8/1988 | Spitzer et al. .................... 210/728 |
| 4,868,248 | 9/1989 | Sparapany et al. . |
| 4,902,751 | 2/1990 | Lewellyn et al. . |
| 5,128,420 | 7/1992 | Domb et al. . |

*Primary Examiner*—Peter A. Szekely
*Assistant Examiner*—Edward J. Cain
*Attorney, Agent, or Firm*—James J. Drake; Robert A. Miller

[57] ABSTRACT

The acrylate ester groups of lower acrylate ester latex polymers are converted to hydroxamic groups by the expediency of pH adjustment and using salt free hydroxylamine. Lower reaction temperatures are used. A high HLB surfactant is also used to help further stabilize the particles. The finished modified acrylate ester latex polymers are considered to be new compositions having a use in a variety of industrial applications such as settling agents in the treatment Bayer process liquors.

4 Claims, No Drawings

HYDROXYLAMINE MODIFIED LOWER ACRYLATE ESTER LATICES

FIELD OF THE INVENTION

The invention relates to the formation of hydroxylamine derivatives of lower acrylate latices.

INTRODUCTION

Lower acrylate ester latex polymers are available commercially or may be readily synthesized using known aqueous emulsion polymerization techniques. Emulsion polymerization is the process where monomer is emulsified with the aid of a surfactant, in aqueous medium and then polymerized with the aid of water-soluble initiators. Emulsion polymerization differs from suspension polymerization in its mechanism and reaction characteristics. Polymerization takes place almost exclusively in the interior of the micelles. The micelles act as a meeting place for the oil-soluble monomer and the water soluble initiator. Micelles are also favored as the reaction site because of their high monomer concentration and high surface to volume ratio compared to monomer droplets. The particles in the finished latices are usually in the form of beads.

These latices are concentrated; typically they contain 20-50% solids in the form of minute particles suspended in water. The latex is settling stable due to the nominal weight of the particles and the surfactants employed. The polymers synthesized by this process are water-insoluble, but can be solubilized by hydrolysis.

Typical of lower acrylate esters used to prepare latices of the types described above are the methyl, ethyl, butyl and propyl acrylate esters. Commercial species of many of these materials find use in a variety of industrial applications such as adhesives, coating compositions and the like.

In U.S. Pat. No. 4,767,540 it is shown that methyl acrylate latex polymers which have been copolymerized to contain between 25-50 mole percent of acrylamide may be reacted with hydroxylamine salts, which react primarily with the ester groups, to afford hydroxamic acid groups. Under the reaction conditions shown in the patent, there is no mention or evidence of polymer destabilization (gelation) or settling out of the polymer particles from the aqueous phase. Also in U.S. Pat. No. 4,767,540, conversion to hydroxamic acid groups was attempted on polymers with a maximum methyl acrylate of content of 75%, with the majority of polymers ranging from 10 to 50% methyl acrylate.

While the patentee broadly suggests the reaction may be conducted using hydroxylamine, in no instance is any such reaction shown. In all cases, the patentee uses hydroxylamine salts such as the sulfate or chloride salts to effect the conversion of the methyl acrylate ester groups to hydroxamic acid groups.

In converting the methyl acrylate esters groups to hydroxamic acid groups, the patentee employs elevated temperatures e.g. 50°-70° C. or greater (105° C.).

In the conversion of ester groups to hydroxamic groups, the patentee employs an equivalent amount of base equal to the hydroxylamine salt. Hydroxylamine salts are non-nucleophilic. In order for conversion to take place, salt-free hydroxylamine must be generated. The patentee generates free hydroxylamine, in situ, by adding an equivalent amount of base to the reaction. The reaction of an acid salt with a base (sodium hydroxide) produces free hydroxylamine and 1 equivalent of salt.

$$NH_2OH\ HCl + NaOH \rightarrow NH_2OH + NaCl + H_2O$$

It is believed that the presence of conjugate salts, $Na_2SO_4$ or $NaCl$, derived from the reaction of the hydroxylamine salt with base contribute to the destabilization of the latex.

Also in the conversion of esters to hydroxamic groups, the patentee employs elevated temperatures to enhance conversion. The increase in temperature and the basicity of the solution would enhance the hydrolysis route as opposed to nucleophilic displacement and would render the hydrophobic polymer hydrophilic. The hydrophilic polymer will then "activate", causing gel formation. Furthermore, elevated temperatures enhance the decomposition of the free hydroxylamine.

OBJECTS OF THE INVENTION

In accordance with the present invention, it is one object to simply and readily convert at least 5 mole % of the ester groups in a lower acrylate ester water continuous latex to hydroxamic acid groups by reacting to these latices with a salt free hydroxylamine.

Another object of the invention is to prepare hydroxamic acid containing polymers that are stable, fluid and do not destabilize or precipitate during their preparation.

A further object of the invention is to prepare hydroxamic acid containing polymers which utilize a minimum of hydroxylamine in their preparation, and that little hydroxylamine is destroyed due to the conditions of the reaction.

Finally, it is an object of the invention to provide novel lower acrylate ester latex polymers which contain between 5-50 mole % of hydroxamic acid groups.

THE INVENTION

The invention comprises a method for converting acrylate ester groups of a lower acrylate ester latex polymer into hydroxamic acid groups which comprises of:

a. adding a non-ionic surfactant, having an HLB number of at least 8, to the water-continuous latex;

b. adjusting the pH of the lower acrylate ester latex polymer to at least 10;

c. adding to the above latex polymer solution a salt-free solution of hydroxylamine in an amount sufficient to convert at least 5 mole % of the lower acrylate ester groups to hydroxamic acid groups, and then;

d. reacting the lower acrylate ester latex polymer containing the salt free solution of hydroxylamine at a temperature ranging from about 5° to 40° C. for a period of time to convert the lower acrylate ester groups to hydroxamic acid groups.

THE STARTING LOWER ACRYLATE ESTER LATEX POLYMERS

As indicated, these polymers are well known and are readily prepared using conventional emulsion polymerization techniques. One of the advantages of using these materials in the preparation of water soluble polymers which contain hydroxamic acid groups, is that the concentration of the dissolved solids in these latices is substantial e.g. between 20-50% solids. For certain uses to which the finished polymers may be employed, it is sometimes beneficial that the starting lower acrylate latex polymers contain between 5–20 mole % and preferably 5–10 mole % of either acrylic acid or acrylamide. These starting latices have a molecular weight of at least 200,000. The preferred polymers have Reduced Specific Viscosity as measured in 1N Sodium Nitrate of at least 35 dL/g Typically the Reduced Specific Viscosity of the preferred starting polymers will range between about 45–55 dL/g The lower acrylate esters that are utilized in the practice of the invention may be the methyl, ethyl, butyl or propyl acrylate esters e.g. C1–C4. Due to availability and ease of conversion of the ester group into hydroxamic groups, the methyl acrylate latices are the preferred polymeric species to use in preparing the modified hydroxamic polymers described.

REACTION CONDITIONS

There are two important manipulative steps of the process of the invention before chemical transformation. This process will occur under highly basic conditions. In order to help further stabilize the polymer particles, additional surfactant is added. Any non-ionic surfactant, which is an oil-in-water emulsifier having an HLB number of at least 8 and preferably 10–16, is suitable, however the preferred surfactants were ethoxylated nonylphenols or ethoxylated octylphenols. These substituted phenols contain between 8–12 moles of ethylene oxide. The surfactant concentration should be between 1 and 5% based on the weight of polymer solids, the preferred range is between 1 and 3%. The solution is cooled to between 5° and 10° C. and the pH of the latex solution adjusted to between 9 and 14. Usually a pH between 10 and 12 produces good results.

Another important step of the process is that the lower acrylate latices be treated with a salt free hydroxylamine aqueous solution. This solution is added slowly to the starting latex while the reaction temperature is maintained within 5°–40° C. For good results, it is important that lower temperatures be employed therefore temperatures between 5° C. and room temperature, about 24° C., are ideal for maximizing the conversion of the acrylate ester groups into hydroxamic groups to provide a finished product that is stable.

The amount of hydroxylamine used in the reaction will vary depending upon the amount of acrylate ester group sought to be converted to hydroxamic acid groups. Typically, the polymers that contain 5–50 mole % of hydroxamic acid groups are suitable for use in a variety of commercial applications such as the treatment of red mud suspensions to improve settling and the treatment of drilling fluids. In order to achieve a good conversion of the acrylate ester groups into hydroxamic acid groups, it is frequently necessary to employ a molar excess of the starting hydroxylamine. Molar excesses ranging between about 0.2 up to one mole will assure adequate and complete conversion of the ester groups to the hydroxamic acid groups. A typical commercially available hydroxylamine solution contains 50% by weight of hydroxylamine. As the addition of the salt-free hydroxylamine continues, it is frequently the case that some hydrolysis of the ester groups occur. This causes a thickening of the solution in which case dilution with additional water should be made.

EVALUATION OF THE INVENTION

To illustrate the disadvantages of the prior art preparative techniques and the advantages afforded by the present invention, the following are given by way of examples. The starting acrylate latex polymer hereafter referred to as "Composition A" and used in the Examples was a water continuous latex containing 95 mole % methyl acrylate and 5 mole % of acrylic acid copolymer in the form of an aqueous emulsion which contains 30% solids. The RSV of this material was 55.

Example 1

The initial attempts to incorporate the hydroxylamine functionality was based on the prior art (U.S. Pat. No. 4,767,540). In the published procedure solid hydroxylamine sulfate was added to composition A at a pH range of 7–9. Under these basic conditions, the salt, in the form of $Na_2SO_4$ was freed. The polymer condensed and solidified. The solid would not dissolve in water. It was believed that the freed salt was the cause of this phenomenon. This effect was confirmed by the addition of solid $Na_2SO_4$ to composition A, which yielded the same solid, condensed polymer. Attempts were then made to generate salt-free hydroxylamine, by precipitating the solid $Na_2SO_4$ in basic methanol. This was successful, but the presence of residual methanol was undesirable.

Example 2

Free hydroxylamine as a 50% solution was obtained and found to have a pH of 10.5. In the initial hydroxamination attempts, a 50 to 100% excess of hydroxylamine was used, and the pH of the latex ranged from 7 to 9. These mixtures were heated at 65°–75° C. for 3–6 hours. This afforded no hydroxylamine incorporation (by NMR spectroscopy). It is probable that the increased heat accelerated the decomposition of the hydroxylamine.

Example 3

When the pH is basic, at least two competing reactions are possible, hydrolysis to form the acrylate salt and nucleophilic displacement to form the substituted amide. Once the amide had been formed, hydrolysis is unlikely. The pH of the latex was adjusted to 11.0 by addition of 1% NaOH. Salt-free hydroxylamine was added in a 0.5 molar excess (with respect to methyl acrylate) and allowed to stir at room temperature for 24 hours. Throughout the course of the reaction the solution thickened due to ester hydrolysis and water was added to maintain fluidity. NMR spectral analysis revealed approximately 25% incorporation of the hydroxylamine moiety. Because of the multiple dilutions the % polymer solids was a low e.g. 6.8. The RSV of the material was 13.6.

Example 4

The previous experiment was repeated with greater attention to the dilution of the polymer, the reaction temperature and the accompanying ester hydrolysis. To further stabilize the polymer particles, a non-ionic surfactant (ethoxylated nonylphenol) was added at 1.5%, based on the weight of latex solids. The latex was externally cooled in ice to 0°–5° C. The pH was adjusted using 50% NaOH to 11.6. Hydroxylamine (salt-free) was added in a 0.5 molar excess. The mixture was stirred at 5° C. for 5 hours. Some thickening was observed. The RSV of the polymer decreased from 55 to 44 and the % polymer solids were 18.4. The NMR spectral analysis indicated approximately 33% incorporation of the hydroxylamine functionality.

Example 5

The modified polymer produced in Example 4 was used in settling tests on a Bayer liquor to show its activity as a flocculent. It was compared in these tests to a commercial ammonium polyacrylate polymer and it showed activity comparable to this commercially used polymer.

The process of the invention produces a novel lower acrylate ester latex polymer which contains 5–50 mole % ester groups converted to hydroxamic groups. The preferred latex polymers, in addition to containing the hydroxamic acid groups, contains from 5–20 mole % and preferably 5–10 mole % of either acrylic acid or acrylamide.

I claim:

1. A method for converting acrylate ester groups of a lower acrylate ester latex polymer, derived from a classical oil-in-water emulsion, into hydroxamic acid groups which comprises the steps of:

a. adding a non-ionic surfactant having an HLB number of at least 8 to the latex;
   b. adjusting the pH of the lower acrylate ester latex polymer to at least 10;
   c. adding to the above latex polymer solution a salt-free solution of hydroxylamine in an amount sufficient to convert at least 5 mole % of the lower acrylate ester groups to hydroxamic acid groups, and then;
   d. reacting the lower acrylate ester latex polymer containing the salt free solution of hydroxylamine at a temperature ranging from about 5° to 40° C. for a period of time to convert the lower acrylate ester groups to hydroxamic acid groups.

2. The method of claim 1 where the lower acrylate ester is methyl acrylate.

3. The method of claim 1 where the lower acrylate ester latex polymer contains from 5–20 mole % of acrylic acid or acrylamide.

4. The method of claim 1 where the lower acrylate ester latex polymer contains from 5–10 mole % of acrylic acid.

* * * * *